United States Patent
Hong et al.

(10) Patent No.: US 11,259,027 B2
(45) Date of Patent: **\*Feb. 22, 2022**

(54) SYSTEM AND METHOD FOR CONSTRUCTING A PLANE FOR PLANAR PREDICTION

(71) Applicant: ARRIS Enterprises LLC, Suwanee, GA (US)

(72) Inventors: Seungwook Hong, San Diego, CA (US); Limin Wang, San Diego, CA (US); Krit Panusopone, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/890,684

(22) Filed: Jun. 2, 2020

(65) Prior Publication Data
US 2020/0296384 A1 Sep. 17, 2020

Related U.S. Application Data

(63) Continuation of application No. 16/223,932, filed on Dec. 18, 2018, now Pat. No. 10,694,188.

(Continued)

(51) Int. Cl.
*H04N 19/11* (2014.01)
*H04N 19/139* (2014.01)
(Continued)

(52) U.S. Cl.
CPC ......... *H04N 19/139* (2014.11); *H04N 19/105* (2014.11); *H04N 19/11* (2014.11);
(Continued)

(58) Field of Classification Search
CPC .... H04N 19/13; H04N 19/105; H04N 19/139; H04N 19/172; H04N 19/521
See application file for complete search history.

(56) References Cited

U.S. PATENT DOCUMENTS 9,172,953 B2 * 10/2015 He .................. H04N 19/463
10,142,624 B2 * 11/2018 Terada ............. H04N 19/91
(Continued)

FOREIGN PATENT DOCUMENTS

EP 2728884 A1 5/2014
EP 2890130 A1 7/2015

OTHER PUBLICATIONS

J. Chen, et al., "Algorithm Description of Joint Exploration Test Model 5 (JEM 5)", JVET-E1001-V2.
(Continued)

*Primary Examiner* — Tsion B Owens
(74) *Attorney, Agent, or Firm* — Chernoff, Vilhauer, McClung & Stenzel, LLP

(57) ABSTRACT

A system and method of defining a plane for planar coding in JVET in which first and second lines can be defined based upon pixels in left-adjacent and top-adjacent coding units. In some embodiments, the least squares method can be employed to define the relevant lines. One point along each of the lines can then be identified and the y-intercepts of the two lines can be averaged to obtain a third point. The three points can then be used to identify and define a plane for planar coding in JVET.

10 Claims, 11 Drawing Sheets

Related U.S. Application Data

(60) Provisional application No. 62/599,915, filed on Dec. 18, 2017.

(51) Int. Cl.
*H04N 19/105* (2014.01)
*H04N 19/147* (2014.01)
*H04N 19/196* (2014.01)
*H04N 19/593* (2014.01)
*H04N 19/46* (2014.01)
*H04N 19/463* (2014.01)
*H04N 19/13* (2014.01)
*H04N 19/172* (2014.01)
*H04N 19/174* (2014.01)
*H04N 19/513* (2014.01)

(52) U.S. Cl.
CPC .......... *H04N 19/13* (2014.11); *H04N 19/147* (2014.11); *H04N 19/172* (2014.11); *H04N 19/174* (2014.11); *H04N 19/196* (2014.11); *H04N 19/46* (2014.11); *H04N 19/463* (2014.11); *H04N 19/521* (2014.11); *H04N 19/593* (2014.11)

(56) References Cited

U.S. PATENT DOCUMENTS

| | | | |
|---|---|---|---|
| 11,109,027 B2* | 8/2021 | Urban | H04N 19/60 |
| 2012/0294358 A1 | 11/2012 | Suzuki et al. | |
| 2013/0022110 A1* | 1/2013 | Kumakura | H04N 19/105 375/240.03 |
| 2013/0028530 A1* | 1/2013 | Drugeon | H04N 19/136 382/233 |
| 2016/0100175 A1* | 4/2016 | Laroche | H04N 19/186 375/240.18 |
| 2017/0094314 A1* | 3/2017 | Zhao | H04N 19/625 |

OTHER PUBLICATIONS

PCT International Search Report & Written Opinion, RE: Application No. PCT/US2017/068605, dated Jun. 8, 2018.
J. Lainema, et al., "Intra Coding of the HEVC Standard", IEEE Transactions on Circuits and Systems for Video Technology, Institute of Electrical and Electronics Engineers, vol. 22, No. 12, Dec. 1, 2012, pp. 1792-1801.
K. Ugur, et al., "Description of Video Coding Technology Proposal by Tandberg, Nokia, Ericsson", 1st JCT-VC Meeting, No. JCTVC-A119, Apr. 12, 2010.
PCT International Search Report & Written Opinion, RE: Application No. PCT/US2017/068682, dated Mar. 16, 2018.
S. Yu, et al., "Distance-based weighted prediction for H.264 intra coding", ICALIP 2008, Audio Language and Image Processing, Jul. 7, 2008.
K. Panusopone, et al., "Unequal Weight Planar Prediction and Constrained PDPC", 5th JVET Meeting, Geneva, No. JVET-E0068, Jan. 5, 2017.
PCT International Search Report & Written Opinion, RE: Application No. PCT/US2017/068654, dated Mar. 16, 2018.
"Algorithm Description of Joint Exploration Test Model 4 (JEM4)", 116th MPEG Meeting, Chengdu, No. N16511, Nov. 21, 2016.
PCT International Search Report & Written Opinion, RE: Application No. PCT/US2018/066225, dated Feb. 21, 2019.
S.H. Lee, et al., "Intra prediction method based on the linear relationship between the channels for YUV 4:2:0 intra coding", ICIP, Nov. 7, 2009, pp. 1037-1040.
J. Chen, et al., "Chroma intra prediction by scaled luma samples using integer operations", 3rd JCT-VC Meeting, 94th MPEG Meeting, Guangzhou, No. JCTVC-C206, Oct. 2, 2010.
S. Kanumuri, et al., "Enhancements to Intra Coding", 4th JCT-VC Meeting, 95th MPEG Meeting, Daegu, No. JCTVC-D235, Jan. 14, 2011.
J. Lainema, et al., "Intra Coding of the HEVC Standard", IEEE Transactions on Circuits and Systems for Video Technology, Institute of Electrical and Electronics Engineers, vol. 22, No. 12, Dec. 1, 2012, 1792-1801.

* cited by examiner

SYSTEM AND METHOD FOR CONSTRUCTING A PLANE FOR PLANAR PREDICTION

CLAIM OF PRIORITY

This Application is a continuation of U.S. patent application Ser. No. 16/223,932 filed on Dec. 18, 2019, which claims priority under 35 U.S.C. § 119(e) from earlier filed U.S. Provisional Application Ser. No. 62/599,915, filed Dec. 18, 2017 all of which are hereby incorporated by reference.

TECHNICAL FIELD

The present disclosure relates to the field of video coding, and more particularly establishment of a plane for planar prediction.

BACKGROUND

The technical improvements in evolving video coding standards illustrate the trend of increasing coding efficiency to enable higher bit-rates, higher resolutions, and better video quality. The Joint Video Exploration Team is developing a new video coding scheme referred to as JVET. Similar to other video coding schemes like HEVC (High Efficiency Video Coding), JVET is a block-based hybrid spatial and temporal predictive coding scheme. However, relative to HEVC, JVET includes many modifications to bitstream structure, syntax, constraints, and mapping for the generation of decoded pictures. JVET has been implemented in Joint Exploration Model (JEM) encoders and decoders.

Intra coding is a main tool for video compression. It utilizes the spatial neighbors of a pixel to create a predictor, from which a perdition residual between the pixel and its predictor is determined. Video encoder then compresses the residuals, resulting in the coding bitstream. The developing video coding standard, JVET, allows 67 possible intra prediction modes, including planar mode, DC mode, and 65 angular direction modes. Each intra coding unit (CU) selects one intra prediction mode to be used, which needs to be signaled as overhead in bitstream. What is needed is a system and method to construct a predicted plane for the planar mode.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect can include receiving a first set of data points wherein the step of receiving can also include receiving a second set of data points, determining a first line based at least in part of said first set of data points, determined a second line based at least in part on said second set of data points and determining a plane based at least in part on one point on said first line and one point on said second line. Other embodiments of this aspect include corresponding computer systems, apparatus, and computer programs recorded on one or more computer storage devices, each configured to perform the actions of the methods.

Alternate embodiments can comprise one or more of the following features: The method of plane definition in jvet where said step of determining a plane is based at least in part on a y-intercept of one of said first line and said second line; the method of plane definition of jvet where said step of determining a first line is based at least in part on application of the least squares method on said first set of data points; the method of plane definition of jvet where said step of determining a second line is based at least in part on application of the least squares method on said second set of data points; the method of plane definition of jvet where said step of determining a plane is based at least in part on a y-intercept of said first line; the method of plane definition of jvet where said step of determining a plane is based at least in part on an average of the y-intercept of said first line and the y-intercept of said second line; the method of plane definition of jvet where said step of determining a first line is based at least in part on application of the least squares method on said first set of data points; the method of plane definition of jvet where said step of determining a second line is based at least in part on application of the least squares method on said second set of data points; the method of plane definition of jvet further including the step of entropy coding a coding unit based at least in part on said plane. Implementations of the described techniques may include hardware, a method or process, or computer software on a computer-accessible medium.

One general aspect can comprise a system of plane definition in jvet including: receiving in memory a first set of data points, receiving in memory a second set of data points, defining and storing in memory characteristics of a first line based at least in part of said first set of data points, defining and storing in memory characteristics of a second line based at least in part on said second set of data points, and defining and storing in memory characteristics of a plane based at least in part on one point on said first line and one point on said second line. Other embodiments of this aspect include corresponding computer systems, apparatus, and computer programs recorded on one or more computer storage devices, each configured to perform the actions of the methods and some embodiments of the described techniques can include hardware, a method or process, or computer software on a computer-accessible medium.

BRIEF DESCRIPTION OF THE DRAWINGS

Further details of the present invention are explained with the help of the attached drawings in which.

DETAILED DESCRIPTION

Figure 1:
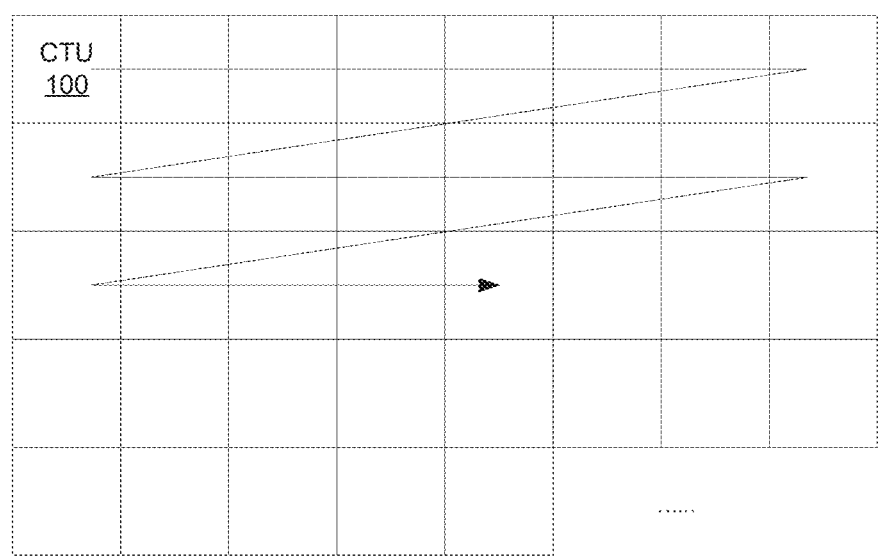
FIG. 1 depicts division of a frame into a plurality of Coding Tree Units (CTUs).

FIG. 1 depicts division of a frame into a plurality of Coding Tree Units (CTUs) 100. A frame can be an image in a video sequence. A frame can include a matrix, or set of matrices, with pixel values representing intensity measures in the image. Thus, a set of these matrices can generate a video sequence. Pixel values can be defined to represent color and brightness in full color video coding, where pixels are divided into three channels. For example, in a YCbCr color space pixels can have a luma value, Y, that represents gray level intensity in the image, and two chrominance values, Cb and Cr, that represent the extent to which color differs from gray to blue and red. In other embodiments, pixel values can be represented with values in different color spaces or models. The resolution of the video can determine the number of pixels in a frame. A higher resolution can mean more pixels and a better definition of the image, but can also lead to higher bandwidth, storage, and transmission requirements.

Frames of a video sequence can be encoded and decoded using JVET. JVET is a video coding scheme being developed by the Joint Video Exploration Team. Versions of JVET have been implemented in JEM (Joint Exploration Model) encoders and decoders. Similar to other video coding schemes like HEVC (High Efficiency Video Coding), JVET is a block-based hybrid spatial and temporal predictive coding scheme. During coding with JVET, a frame is first divided into square blocks called CTUs 100, as shown in FIG. 1. For example, CTUs 100 can be blocks of 128×128 pixels.

Figure 2:
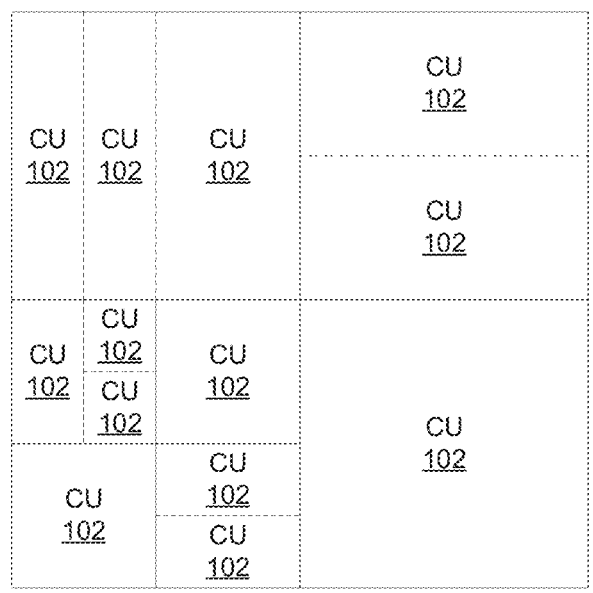
FIG. 2 depicts an exemplary partitioning of a CTU into Coding Units (CUs).

FIG. 2 depicts an exemplary partitioning of a CTU 100 into CUs 102. Each CTU 100 in a frame can be partitioned into one or more CUs (Coding Units) 102. CUs 102 can be used for prediction and transform as described below. Unlike HEVC, in JVET the CUs 102 can be rectangular or square and can be coded without further partitioning into prediction units or transform units. The CUs 102 can be as large as their root CTUs 100 or be smaller subdivisions of a root CTU 100 as small as 4×4 blocks.

In JVET, a CTU 100 can be partitioned into CUs 102 according to a quadtree plus binary tree (QTBT) scheme in which the CTU 100 can be recursively split into square blocks according to a quadtree, and those square blocks can then be recursively split horizontally or vertically according to binary trees. Parameters can be set to control splitting according to the QTBT, such as the CTU size, the minimum sizes for the quadtree and binary tree leaf nodes, the maximum size for the binary tree root node, and the maximum depth for the binary trees.

By way of a non-limiting example, FIG. 2 shows a CTU 100 partitioned into CUs 102, with solid lines indicating quadtree splitting and dashed lines indicating binary tree splitting. As illustrated, the binary splitting allows horizontal splitting and vertical splitting to define the structure of the CTU and its subdivision into CUs.

Figure 3:
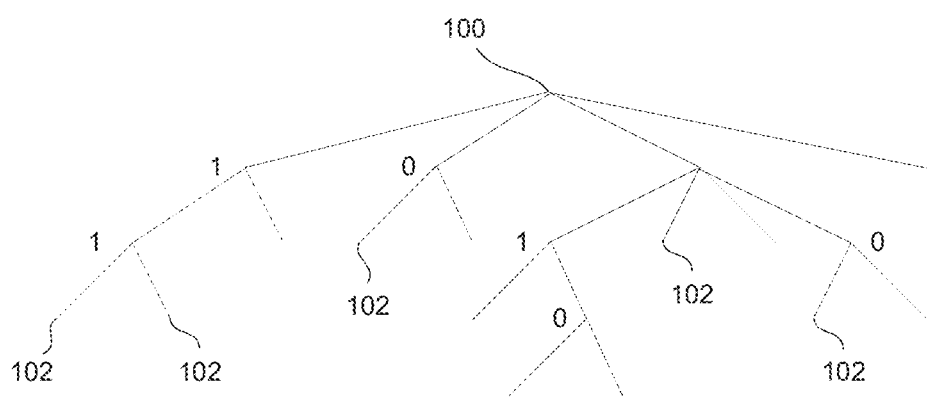
FIG. 3 depicts a quadtree plus binary tree (QTBT) representation of FIG. 2's CU partitioning.

FIG. 3 depicts a QTBT representation of FIG. 2's partitioning. A quadtree root node represents the CTU 100, with each child node in the quadtree portion representing one of four square blocks split from a parent square block. The square blocks represented by the quadtree leaf nodes can then be divided zero or more times using binary trees, with the quadtree leaf nodes being root nodes of the binary trees. At each level of the binary tree portion, a block can be divided either vertically or horizontally. A flag set to "0" indicates that the block is split horizontally, while a flag set to "1" indicates that the block is split vertically.

After quadtree splitting and binary tree splitting, the blocks represented by the QTBT's leaf nodes represent the final CUs 102 to be coded, such as coding using inter prediction or intra prediction. For slices or full frames coded with inter prediction, different partitioning structures can be used for luma and chroma components. For example, for an inter slice a CU 102 can have Coding Blocks (CBs) for different color components, such as such as one luma CB and two chroma CBs. For slices or full frames coded with intra prediction, the partitioning structure can be the same for luma and chroma components.

Figure 4:
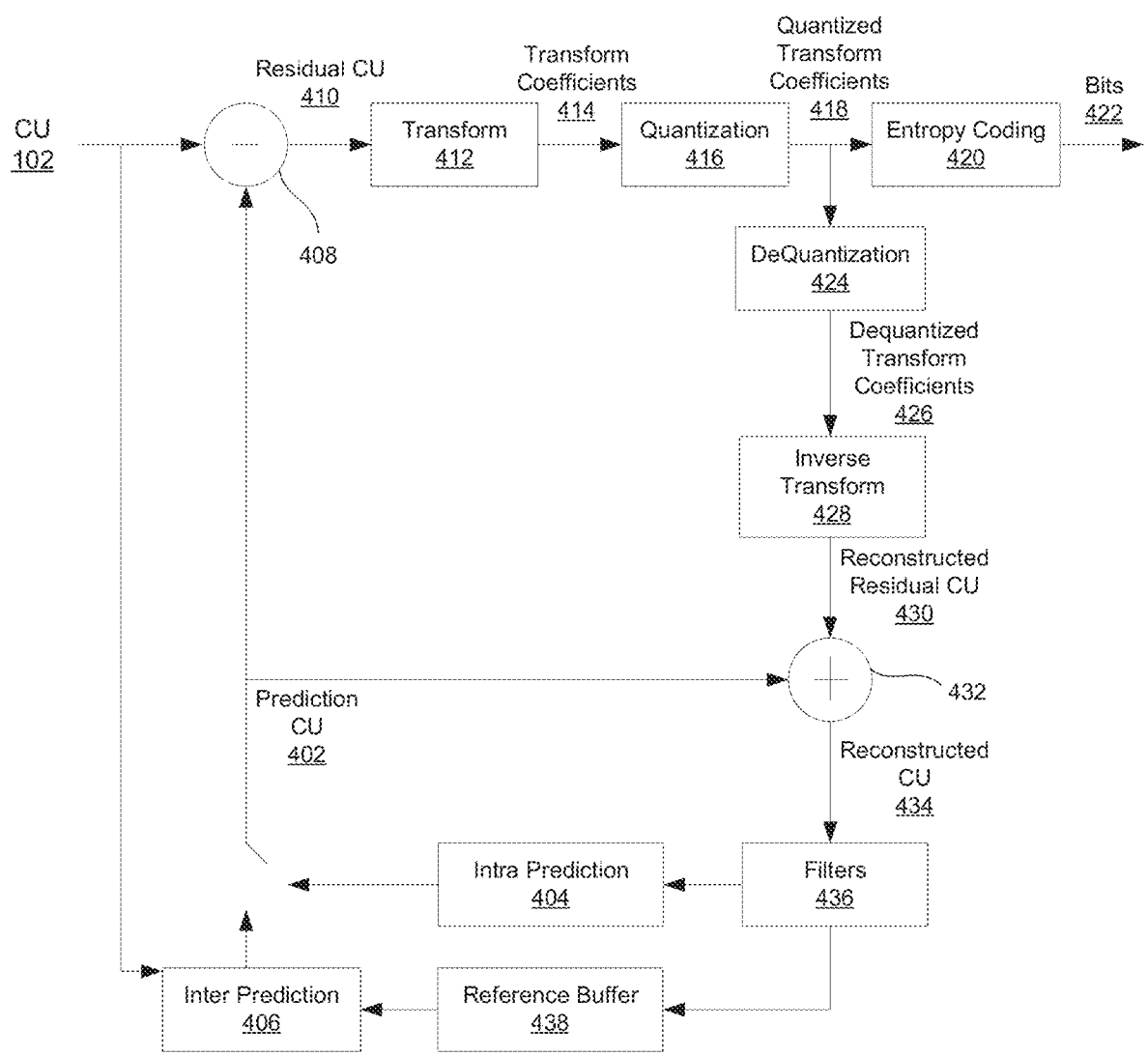
FIG. 4 depicts a simplified block diagram for CU coding in a JVET encoder.

FIG. 4 depicts a simplified block diagram for CU coding in a JVET encoder. The main stages of video coding include partitioning to identify CUs 102 as described above, followed by encoding CUs 102 using prediction at 404 or 406, generation of a residual CU 410 at 408, transformation at 412, quantization at 416, and entropy coding at 420. The encoder and encoding process illustrated in FIG. 4 also includes a decoding process that is described in more detail below.

Given a current CU 102, the encoder can obtain a prediction CU 402 either spatially using intra prediction at 404 or temporally using inter prediction at 406. The basic idea of prediction coding is to transmit a differential, or residual, signal between the original signal and a prediction for the original signal. At the receiver side, the original signal can be reconstructed by adding the residual and the prediction, as will be described below. Because the differential signal has a lower correlation than the original signal, fewer bits are needed for its transmission.

A slice, such as an entire picture or a portion of a picture, coded entirely with intra-predicted CUs can be an I slice that can be decoded without reference to other slices, and as such can be a possible point where decoding can begin. A slice coded with at least some inter-predicted CUs can be a predictive (P) or bi-predictive (B) slice that can be decoded based on one or more reference pictures. P slices may use intra-prediction and inter-prediction with previously coded slices. For example, P slices may be compressed further than the I-slices by the use of inter-prediction, but need the coding of a previously coded slice to code them. B slices can use data from previous and/or subsequent slices for its coding, using intra-prediction or inter-prediction using an interpolated prediction from two different frames, thus increasing the accuracy of the motion estimation process. In some cases P slices and B slices can also or alternately be encoded using intra block copy, in which data from other portions of the same slice is used.

As will be discussed below, intra prediction or inter prediction can be performed based on reconstructed CUs 434 from previously coded CUs 102, such as neighboring CUs 102 or CUs 102 in reference pictures.

When a CU 102 is coded spatially with intra prediction at 404, an intra prediction mode can be found that best predicts pixel values of the CU 102 based on samples from neighboring CUs 102 in the picture.

Figure 5:
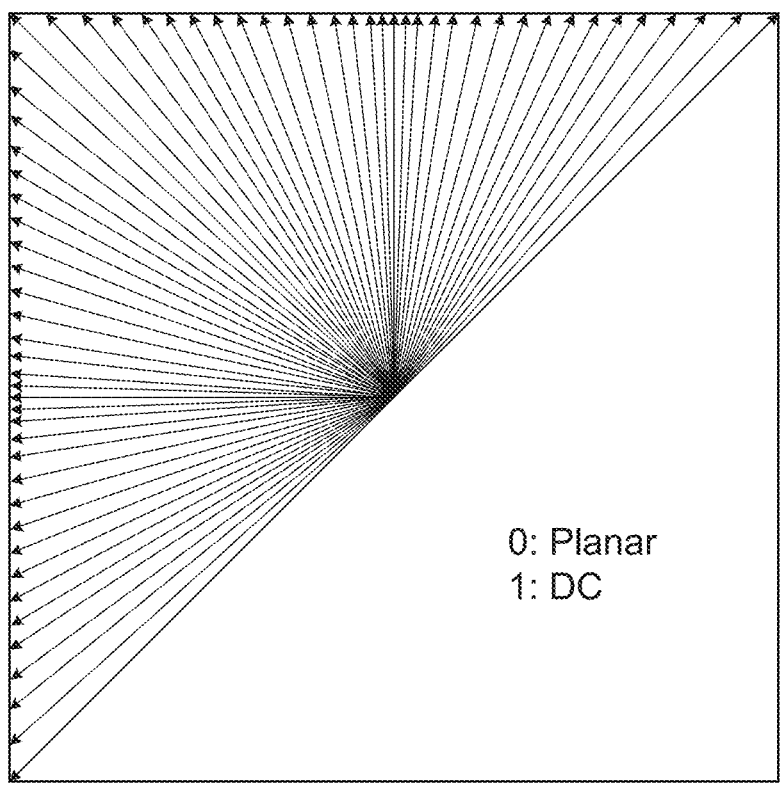
FIG. 5 depicts possible intra prediction modes for luma components in JVET.

When coding a CU's luma component, the encoder can generate a list of candidate intra prediction modes. While HEVC had 35 possible intra prediction modes for luma components, in JVET there are 67 possible intra prediction modes for luma components. These include a planar mode that uses a three dimensional plane of values generated from neighboring pixels, a DC mode that uses values averaged from neighboring pixels, and the 65 directional modes shown in FIG. 5 that use values copied from neighboring pixels along the indicated directions.

When generating a list of candidate intra prediction modes for a CU's luma component, the number of candidate modes on the list can depend on the CU's size. The candidate list can include: a subset of HEVC's 35 modes with the lowest SATD (Sum of Absolute Transform Difference) costs; new directional modes added for JVET that neighbor the candidates found from the HEVC modes; and modes from a set of six most probable modes (MPMs) for the CU 102 that are identified based on intra prediction modes used for previously coded neighboring blocks as well as a list of default modes.

When coding a CU's chroma components, a list of candidate intra prediction modes can also be generated. The list of candidate modes can include modes generated with cross-component linear model projection from luma samples, intra prediction modes found for luma CBs in particular collocated positions in the chroma block, and chroma prediction modes previously found for neighboring blocks. The encoder can find the candidate modes on the lists with the lowest rate distortion costs, and use those intra prediction modes when coding the CU's luma and chroma components. Syntax can be coded in the bitstream that indicates the intra prediction modes used to code each CU 102.

After the best intra prediction modes for a CU 102 have been selected, the encoder can generate a prediction CU 402 using those modes. When the selected modes are directional modes, a 4-tap filter can be used to improve the directional accuracy. Columns or rows at the top or left side of the prediction block can be adjusted with boundary prediction filters, such as 2-tap or 3-tap filters.

The prediction CU 402 can be smoothed further with a position dependent intra prediction combination (PDPC) process that adjusts a prediction CU 402 generated based on filtered samples of neighboring blocks using unfiltered samples of neighboring blocks, or adaptive reference sample smoothing using 3-tap or 5-tap low pass filters to process reference samples.

When a CU 102 is coded temporally with inter prediction at 406, a set of motion vectors (MVs) can be found that points to samples in reference pictures that best predict pixel values of the CU 102. Inter prediction exploits temporal redundancy between slices by representing a displacement of a block of pixels in a slice. The displacement is determined according to the value of pixels in previous or following slices through a process called motion compensation. Motion vectors and associated reference indices that indicate pixel displacement relative to a particular reference picture can be provided in the bitstream to a decoder, along with the residual between the original pixels and the motion compensated pixels. The decoder can use the residual and signaled motion vectors and reference indices to reconstruct a block of pixels in a reconstructed slice.

In JVET, motion vector accuracy can be stored at 1/16 pel, and the difference between a motion vector and a CU's predicted motion vector can be coded with either quarter-pel resolution or integer-pel resolution.

In JVET motion vectors can be found for multiple sub-CUs within a CU 102, using techniques such as advanced temporal motion vector prediction (ATMVP), spatial-temporal motion vector prediction (STMVP), affine motion compensation prediction, pattern matched motion vector derivation (PMMVD), and/or bi-directional optical flow (BIO).

Using ATMVP, the encoder can find a temporal vector for the CU 102 that points to a corresponding block in a reference picture. The temporal vector can be found based on motion vectors and reference pictures found for previously coded neighboring CUs 102. Using the reference block pointed to by a temporal vector for the entire CU 102, a motion vector can be found for each sub-CU within the CU 102.

STMVP can find motion vectors for sub-CUs by scaling and averaging motion vectors found for neighboring blocks previously coded with inter prediction, together with a temporal vector.

Affine motion compensation prediction can be used to predict a field of motion vectors for each sub-CU in a block, based on two control motion vectors found for the top corners of the block. For example, motion vectors for sub-CUs can be derived based on top corner motion vectors found for each 4×4 block within the CU 102.

PMMVD can find an initial motion vector for the current CU 102 using bilateral matching or template matching. Bilateral matching can look at the current CU 102 and reference blocks in two different reference pictures along a motion trajectory, while template matching can look at corresponding blocks in the current CU 102 and a reference picture identified by a template. The initial motion vector found for the CU 102 can then be refined individually for each sub-CU.

BIO can be used when inter prediction is performed with bi-prediction based on earlier and later reference pictures, and allows motion vectors to be found for sub-CUs based on the gradient of the difference between the two reference pictures.

In some situations local illumination compensation (LIC) can be used at the CU level to find values for a scaling factor parameter and an offset parameter, based on samples neighboring the current CU 102 and corresponding samples neighboring a reference block identified by a candidate motion vector. In JVET, the LIC parameters can change and be signaled at the CU level.

For some of the above methods the motion vectors found for each of a CU's sub-CUs can be signaled to decoders at the CU level. For other methods, such as PMMVD and BIO, motion information is not signaled in the bitstream to save overhead, and decoders can derive the motion vectors through the same processes.

After the motion vectors for a CU 102 have been found, the encoder can generate a prediction CU 402 using those motion vectors. In some cases, when motion vectors have been found for individual sub-CUs, Overlapped Block Motion Compensation (OBMC) can be used when generating a prediction CU 402 by combining those motion vectors with motion vectors previously found for one or more neighboring sub-CUs.

When bi-prediction is used, JVET can use decoder-side motion vector refinement (DMVR) to find motion vectors. DMVR allows a motion vector to be found based on two motion vectors found for bi-prediction using a bilateral template matching process. In DMVR, a weighted combination of prediction CUs 402 generated with each of the two motion vectors can be found, and the two motion vectors can be refined by replacing them with new motion vectors that best point to the combined prediction CU 402. The two refined motion vectors can be used to generate the final prediction CU 402.

At 408, once a prediction CU 402 has been found with intra prediction at 404 or inter prediction at 406 as described above, the encoder can subtract the prediction CU 402 from the current CU 102 find a residual CU 410.

The encoder can use one or more transform operations at 412 to convert the residual CU 410 into transform coefficients 414 that express the residual CU 410 in a transform domain, such as using a discrete cosine block transform (DCT-transform) to convert data into the transform domain. JVET allows more types of transform operations than HEVC, including DCT-II, DST-VII, DST-VII, DCT-VIII, DST-I, and DCT-V operations. The allowed transform operations can be grouped into sub-sets, and an indication of which sub-sets and which specific operations in those sub-sets were used can be signaled by the encoder. In some cases, large block-size transforms can be used to zero out high frequency transform coefficients in CUs 102 larger than a certain size, such that only lower-frequency transform coefficients are maintained for those CUs 102.

In some cases a mode dependent non-separable secondary transform (MDNSST) can be applied to low frequency transform coefficients 414 after a forward core transform. The MDNSST operation can use a Hypercube-Givens Transform (HyGT) based on rotation data. When used, an index value identifying a particular MDNSST operation can be signaled by the encoder.

At 416, the encoder can quantize the transform coefficients 414 into quantized transform coefficients 416. The quantization of each coefficient may be computed by dividing a value of the coefficient by a quantization step, which is derived from a quantization parameter (QP). In some embodiments, the Qstep is defined as $2^{(QP-4)/6}$. Because high precision transform coefficients 414 can be converted into quantized transform coefficients 416 with a finite number of possible values, quantization can assist with data compression. Thus, quantization of the transform coefficients may limit an amount of bits generated and sent by the transformation process. However, while quantization is a lossy operation, and the loss by quantization cannot be recovered, the quantization process presents a trade-off between quality of the reconstructed sequence and an amount of information needed to represent the sequence. For example, a lower QP value can result in better quality decoded video, although a higher amount of data may be required for representation and transmission. In contrast, a high QP value can result in lower quality reconstructed video sequences but with lower data and bandwidth needs.

JVET can utilize variance-based adaptive quantization techniques, which allows every CU 102 to use a different quantization parameter for its coding process (instead of using the same frame QP in the coding of every CU 102 of the frame). The variance-based adaptive quantization techniques adaptively lowers the quantization parameter of certain blocks while increasing it in others. To select a specific QP for a CU 102, the CU's variance is computed. In brief, if a CU's variance is higher than the average variance of the frame, a higher QP than the frame's QP may be set for the CU 102. If the CU 102 presents a lower variance than the average variance of the frame, a lower QP may be assigned.

At 420, the encoder can find final compression bits 422 by entropy coding the quantized transform coefficients 418. Entropy coding aims to remove statistical redundancies of the information to be transmitted. In JVET, CABAC (Context Adaptive Binary Arithmetic Coding) can be used to code the quantized transform coefficients 418, which uses probability measures to remove the statistical redundancies. For CUs 102 with non-zero quantized transform coefficients 418, the quantized transform coefficients 418 can be converted into binary. Each bit ("bin") of the binary representation can then be encoded using a context model. A CU 102 can be broken up into three regions, each with its own set of context models to use for pixels within that region.

Multiple scan passes can be performed to encode the bins. During passes to encode the first three bins (bin0, bin1, and bin2), an index value that indicates which context model to use for the bin can be found by finding the sum of that bin position in up to five previously coded neighboring quantized transform coefficients 418 identified by a template.

A context model can be based on probabilities of a bin's value being '0' or '1'. As values are coded, the probabilities in the context model can be updated based on the actual number of '0' and '1' values encountered. While HEVC used fixed tables to re-initialize context models for each new picture, in JVET the probabilities of context models for new inter-predicted pictures can be initialized based on context models developed for previously coded inter-predicted pictures.

The encoder can produce a bitstream that contains entropy encoded bits 422 of residual CUs 410, prediction information such as selected intra prediction modes or motion vectors, indicators of how the CUs 102 were partitioned from a CTU 100 according to the QTBT structure, and/or other information about the encoded video. The bitstream can be decoded by a decoder as discussed below.

In addition to using the quantized transform coefficients 418 to find the final compression bits 422, the encoder can also use the quantized transform coefficients 418 to generate reconstructed CUs 434 by following the same decoding process that a decoder would use to generate reconstructed CUs 434. Thus, once the transformation coefficients have been computed and quantized by the encoder, the quantized transform coefficients 418 may be transmitted to the decoding loop in the encoder. After quantization of a CU's transform coefficients, a decoding loop allows the encoder to generate a reconstructed CU 434 identical to the one the decoder generates in the decoding process. Accordingly, the encoder can use the same reconstructed CUs 434 that a decoder would use for neighboring CUs 102 or reference pictures when performing intra prediction or inter prediction for a new CU 102. Reconstructed CUs 102, reconstructed slices, or full reconstructed frames may serve as references for further prediction stages.

At the encoder's decoding loop (and see below, for the same operations in the decoder) to obtain pixel values for the reconstructed image, a dequantization process may be performed. To dequantize a frame, for example, a quantized value for each pixel of a frame is multiplied by the quantization step, e.g., (Qstep) described above, to obtain reconstructed dequantized transform coefficients 426. For example, in the decoding process shown in FIG. 4 in the encoder, the quantized transform coefficients 418 of a residual CU 410 can be dequantized at 424 to find dequantized transform coefficients 426. If an MDNSST operation was performed during encoding, that operation can be reversed after dequantization.

At 428, the dequantized transform coefficients 426 can be inverse transformed to find a reconstructed residual CU 430, such as by applying a DCT to the values to obtain the reconstructed image. At 432 the reconstructed residual CU 430 can be added to a corresponding prediction CU 402 found with intra prediction at 404 or inter prediction at 406, in order to find a reconstructed CU 434.

At 436, one or more filters can be applied to the reconstructed data during the decoding process (in the encoder or, as described below, in the decoder), at either a picture level or CU level. For example, the encoder can apply a deblocking filter, a sample adaptive offset (SAO) filter, and/or an adaptive loop filter (ALF). The encoder's decoding process may implement filters to estimate and transmit to a decoder the optimal filter parameters that can address potential artifacts in the reconstructed image. Such improvements increase the objective and subjective quality of the reconstructed video. In deblocking filtering, pixels near a sub-CU boundary may be modified, whereas in SAO, pixels in a CTU 100 may be modified using either an edge offset or band offset classification. JVET's ALF can use filters with circularly symmetric shapes for each 2×2 block. An indication of the size and identity of the filter used for each 2×2 block can be signaled.

If reconstructed pictures are reference pictures, they can be stored in a reference buffer 438 for inter prediction of future CUs 102 at 406.

During the above steps, JVET allows a content adaptive clipping operations to be used to adjust color values to fit between lower and upper clipping bounds. The clipping bounds can change for each slice, and parameters identifying the bounds can be signaled in the bitstream.

Figure 6:
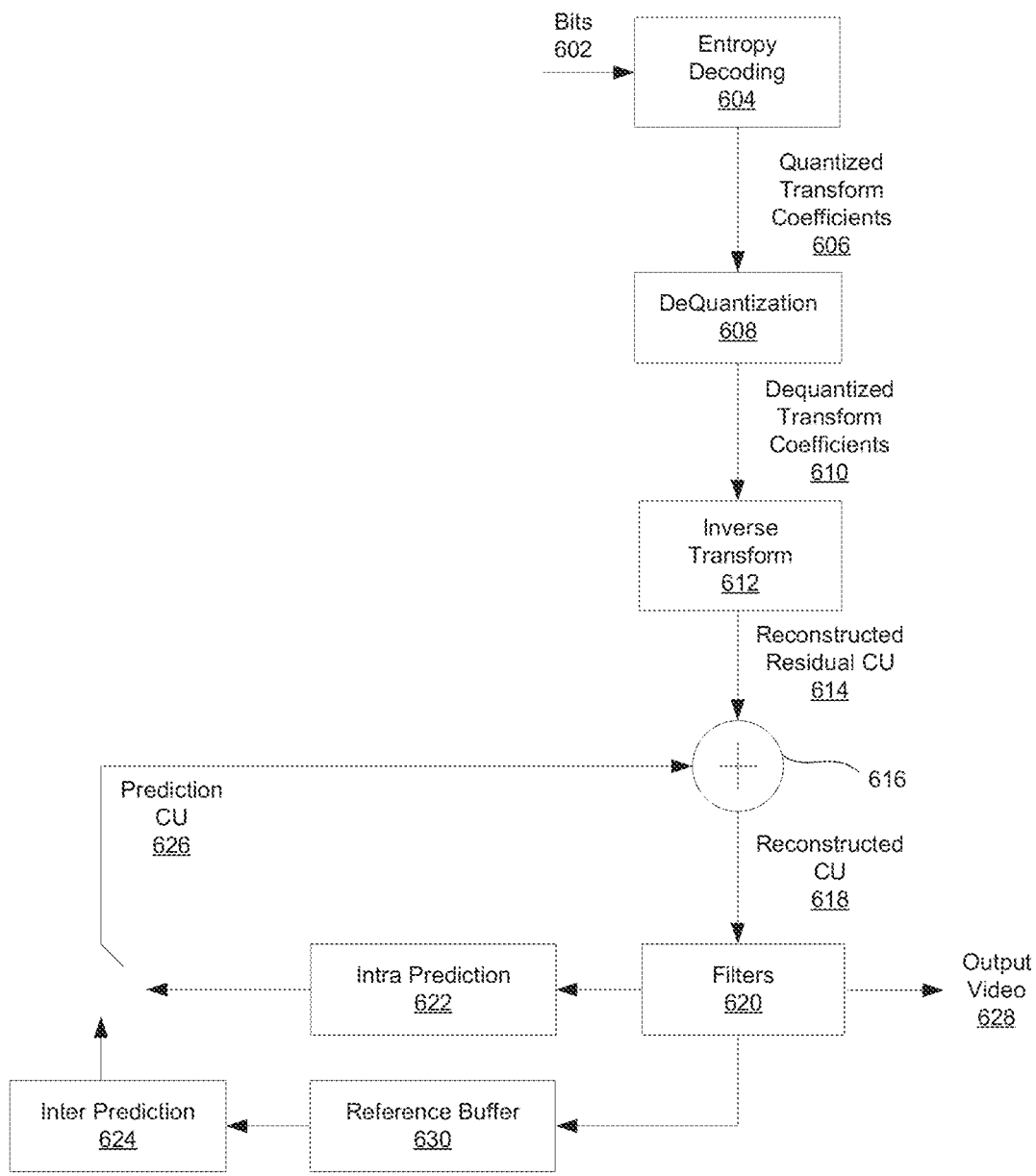
FIG. 6 depicts a simplified block diagram for CU coding in a JVET decoder.

FIG. 6 depicts a simplified block diagram for CU coding in a JVET decoder. A JVET decoder can receive a bitstream containing information about encoded CUs 102. The bitstream can indicate how CUs 102 of a picture were partitioned from a CTU 100 according to a QTBT structure, prediction information for the CUs 102 such as intra prediction modes or motion vectors, and bits 602 representing entropy encoded residual CUs.

At 604 the decoder can decode the entropy encoded bits 602 using the CABAC context models signaled in the bitstream by the encoder. The decoder can use parameters signaled by the encoder to update the context models' probabilities in the same way they were updated during encoding.

After reversing the entropy encoding at 604 to find quantized transform coefficients 606, the decoder can dequantize them at 608 to find dequantized transform coefficients 610. If an MDNSST operation was performed during encoding, that operation can be reversed by the decoder after dequantization.

At 612, the dequantized transform coefficients 610 can be inverse transformed to find a reconstructed residual CU 614. At 616, the reconstructed residual CU 614 can be added to a corresponding prediction CU 626 found with intra prediction at 622 or inter prediction at 624, in order to find a reconstructed CU 618.

At 620, one or more filters can be applied to the reconstructed data, at either a picture level or CU level. For example, the decoder can apply a deblocking filter, a sample adaptive offset (SAO) filter, and/or an adaptive loop filter (ALF). As described above, the in-loop filters located in the decoding loop of the encoder may be used to estimate optimal filter parameters to increase the objective and subjective quality of a frame. These parameters are transmitted to the decoder to filter the reconstructed frame at 620 to match the filtered reconstructed frame in the encoder.

After reconstructed pictures have been generated by finding reconstructed CUs 618 and applying signaled filters, the decoder can output the reconstructed pictures as output video 628. If reconstructed pictures are to be used as reference pictures, they can be stored in a reference buffer 630 for inter prediction of future CUs 102 at 624.

Figure 7B:
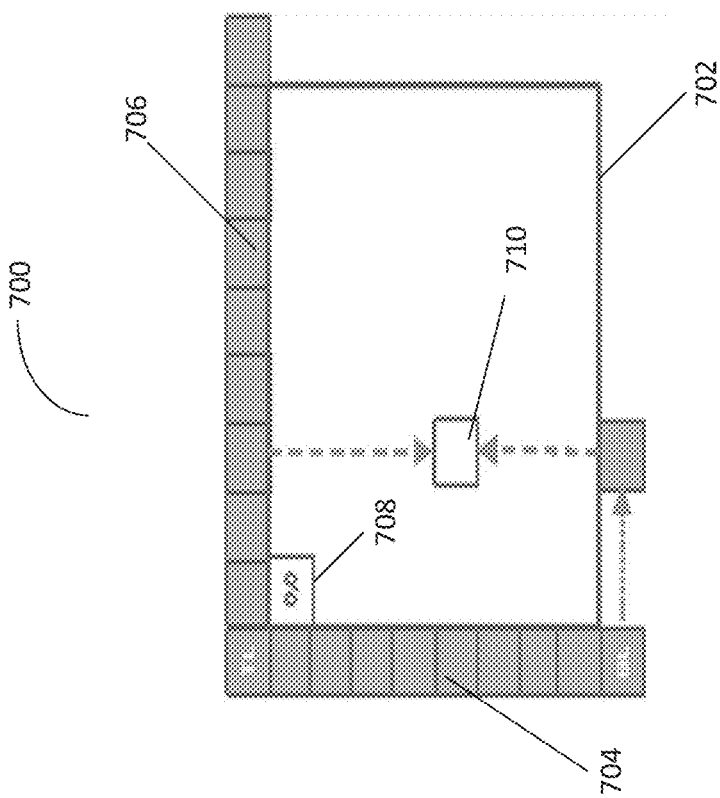
FIGS. 7A and 7B depict and embodiment of a planar prediction process in accordance with JVET.
Figure 7A:
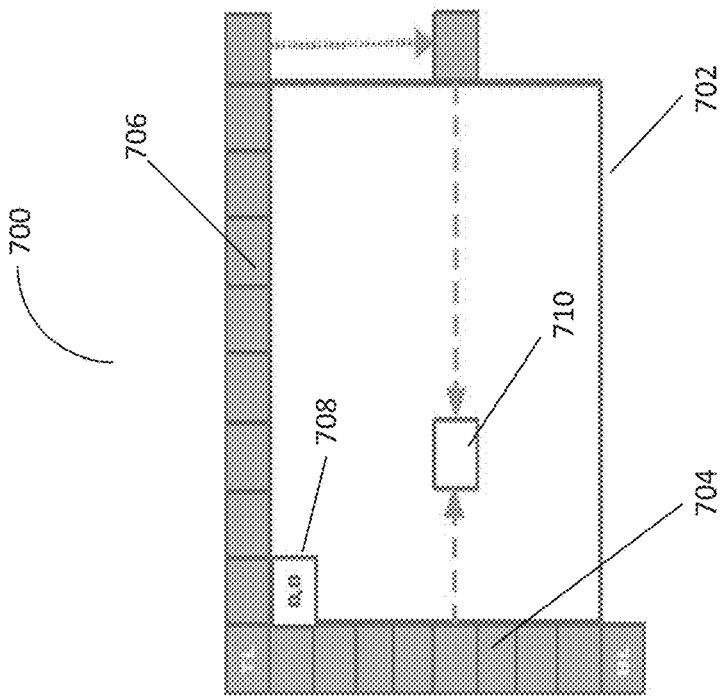

FIGS. 7A and 7B depict embodiments of a planar prediction process 700 in accordance with JVET. Planar mode is often the most frequently used intra coding mode in JVET. FIGS. 7A and 7B show the JVET planar predictor generation process for a coding unit (block) 702 with height 704 H=8 and width 706 W=8, where the (0,0) coordinate corresponds to the top-left position 708 within the coding CU 702.

Planar mode in JVET generates a first order approximation of the prediction for a current Coding Unit (CU) 702, by forming a plane based on the intensity values of the neighboring pixels. Due to the raster-scan coding order, the reconstructed left column neighboring pixels 704 and the reconstructed top row neighboring pixels 706 are available for a current CU 702. However, the right column neighboring pixels and the bottom row neighboring pixels are not available. The planar predictor generation process sets the intensity values of all the right column neighboring pixels 704 to be the same as the intensity value of the top right neighboring pixel, and the intensity values of all the bottom row pixels to be the same as the intensity value of the bottom left neighboring pixel. Once the neighboring pixels surrounding a predicting block are defined, the horizontal and the vertical predictors for each pixel 710 within CU 702 can be determined. The final planar predictor can be computed by averaging the horizontal and vertical predictors, with certain adjustment when the current CU 702 is other than square. FIGS. 7A and 7B provide a demonstrative overview of planar predictor generation process. However, using the process depicted in FIGS. 7A and 7B presents at least one problem with the planar predictor generation process inasmuch as the final planar predictor is not actually a plane.

Disclosed herein are new ways to build a plane over a current CU 702 using the reconstructed left column 704 and top row 706 neighboring pixels wherein the pixel intensity values of the plane can be used as the predictors for the corresponding pixels over the current CU 702.

Figure 8:
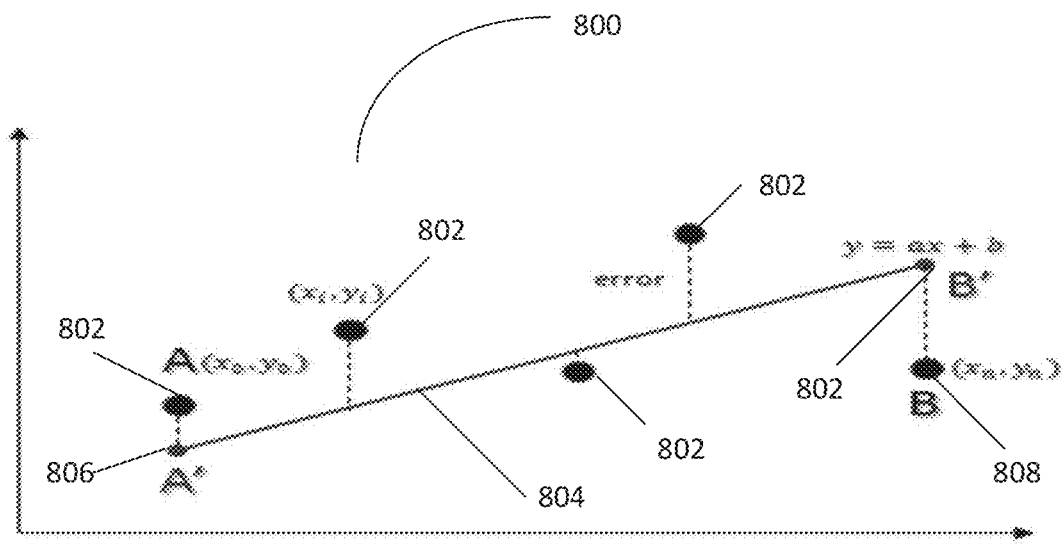
FIG. 8 depicts construction of a prediction line based on a series of points.

FIG. 8 depicts a given set of sample points 802 on an x-y plane from which a line of y=ax+b using the least squares method, which minimizes the sum of the squared residuals between the line and the sample points, can be constructed or defined. FIG. 8 depicts the overall concept of the least squares method.

To apply the least squares method let E(a,b) be the sum of square errors between the fitting line 804 and the given sample points 802, where a is the slope and b is the y-intercept of the fitting line, defined as:

$$E(a,b) = \Sigma(y_n - (ax_n + b))^2$$

By letting the partial derivatives of function E with respect to a and b equal 0, E(a,b) can be minimized. That is represented as:

$$\frac{\partial E}{\partial a} = 0, \frac{\partial E}{\partial b} = 0$$

$$\frac{\partial E}{\partial a} = \sum 2 \cdot (y_n - (ax_n + b)) \cdot (-x_n) = 0$$

$$\frac{\partial E}{\partial b} = \sum 2 \cdot (y_n - (ax_n + b)) \cdot (-1) = 0$$

$$a\sum x_n^2 + b\sum x_n = \sum x_n y_n$$

$$a\sum x_n + b\sum 1 = \sum y_n$$

$$\begin{bmatrix} \sum x_n^2 & \sum x_n \\ \sum x_n & 1 \end{bmatrix} \cdot \begin{bmatrix} a \\ b \end{bmatrix} = \begin{bmatrix} \sum x_n y_n \\ \sum y_n \end{bmatrix}$$

-continued $$\begin{bmatrix} a \\ b \end{bmatrix} = \begin{bmatrix} \sum x_n^2 & \sum x_n \\ \sum x_n & 1 \end{bmatrix}^{-1} \cdot \begin{bmatrix} \sum x_n y_n \\ \sum y_n \end{bmatrix}$$

By solving the above equation, the slope, a, and the y-intercept, b, can be obtained. The line 804 with the slope (a) and y-intercept (b) minimizes the E(a,b) between the fitting line of y=ax+b and the sample points 802 wherein the endpoints of the fitting line 804 are A' 806 and B' 808.

For a current CU 702, there are two sets of the reconstructed neighboring pixels 704 706. One is the set of the left column neighboring pixels 704, and the other is the set of the top row neighboring pixels 706.

Figure 9:
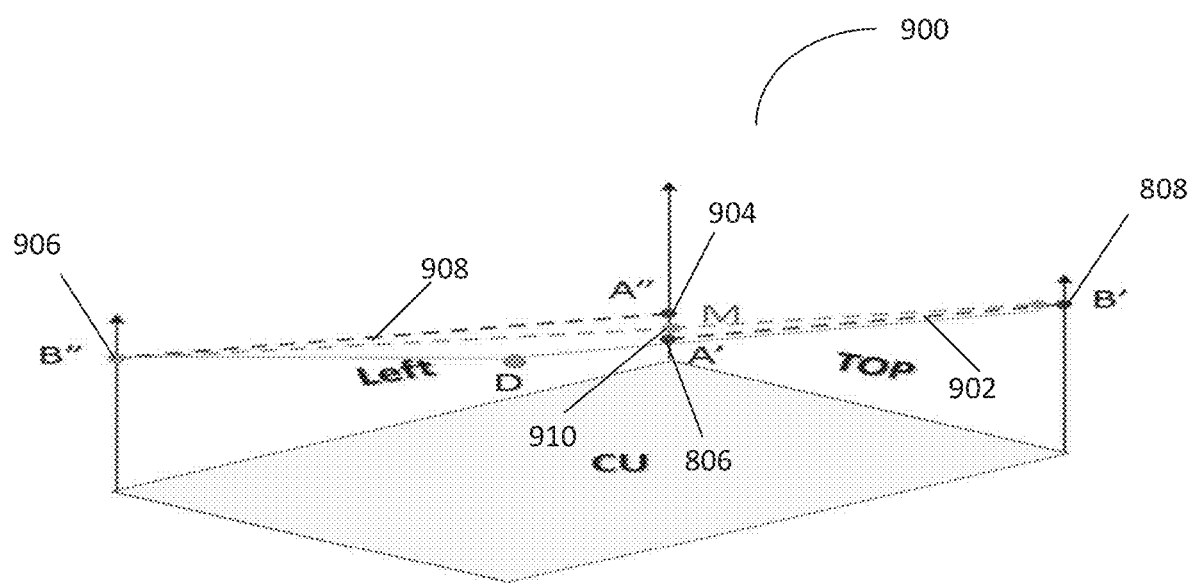
FIG. 9 depicts construction of two prediction lines based upon a pixel of interest.

As depicted in FIG. 9, in some embodiments, the left column neighboring pixels 704 can be used as the sample points 802 to build a fitting line 902 of y=a$_1$x+b$_1$ and the top row neighboring pixels 706 can be used as the sample points 802 to build another fitting line 904 of y=a$_2$x+b$_2$, as depicted in FIG. 9. Thus, if (0,0) is the top-left coordinator of a current CU 702 of dimension N$_x$×N$_y$, a plane can then be defined from three points.

In the embodiment depicted in FIG. 9 the intensity values A' 806 and B' 808 at points (−1,−1) and (N$_x$,−1) from the fitting line 804 y=a$_1$x+b$_1$ can be determined, and the intensity values A" 904 and B" 906 at points (−1,−1) and (−1,N$_y$) from the fitting line 908 y=a$_2$x+b$_2$ can also be determined.

In some instances, the intensity values A' 806 and A" 904 at the same point (−1,−1) may not be the same because they are computed from different sets of sample points 802. Thus, in some embodiments, the values of A' 806 and A" 904 can be averaged to determine a middle value M 910 as:

$$M=(A'+A'')/2$$

Figure 10:
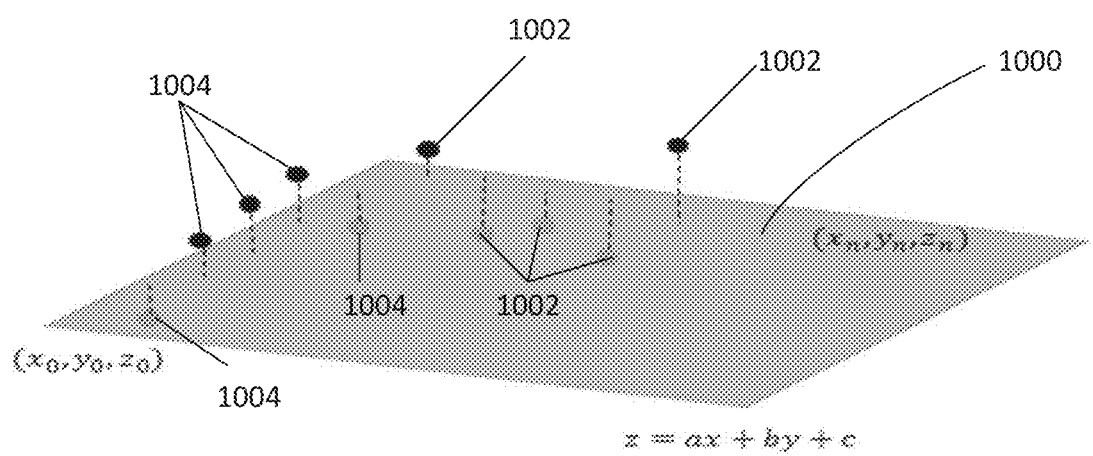
FIG. 10 depicts construction of a prediction plane.

Given the three intensity values M 910, A' 806 and A" 904 at three points (−1, −), (N$_x$,−1) and (−1,N$_y$), a plane can be constructed for use as the predictor plane for the current CU 702. The predictor plane for the CU 702 of form z=ax+by+c from the reconstructed neighboring pixels 802 can be constructed using the least squares method as follows:

Let (x$_n$,y$_n$) be the coordinator of a reconstructed neighboring pixel and z$_n$ be the corresponding intensity value. (x$_n$,y$_n$,z$_n$). This point can then be considered as a sample point in a three dimension space {x,y,z}. The reconstructed neighboring pixels for a current CU 702 form a set of sample points, as shown in FIG. 10. Using the least squares method, a plane 1000 of form z=ax+by+c, which minimizes the sum of square errors between the plane 1000 and the sample points 1002 1004 can be constructed.

Let E(a,b,c) be the sum of square errors between the plane 1000 of z=ax+by+c and the sample points, defined as $$E(a,b,c)=\Sigma(z_n-(ax_n+by_n+c))^2$$

By letting partial derivatives of function E with respect to a, b and c equal 0, the function E(a,b,c) can be minimized as follows.

$$\frac{\partial E}{\partial a} = 0, \frac{\partial E}{\partial b} = 0, \frac{\partial E}{\partial c} = 0$$

$$\frac{\partial E}{\partial a} = \sum 2 \cdot (z_n - (ax_n + by_n + c)) \cdot (-x_n) = 0$$

$$\frac{\partial E}{\partial b} = \sum 2 \cdot (z_n - (ax_n + by_n + c)) \cdot (-y_n) = 0$$

$$\frac{\partial E}{\partial c} = \sum 2 \cdot (z_n - (ax_n + by_n + c)) \cdot (-1) = 0$$

Then the equations can be rewritten as below and presented in matrix form, as follow:

$$a\sum x_n^2 + b\sum x_n y_n + c\sum x_n = \sum z_n x_n$$

$$a\sum x_n y_n + b\sum y_n^2 + c\sum y_n = \sum z_n y_n$$

$$a\sum x_n + b\sum y_n + c\sum 1 = \sum z_n$$

$$\begin{bmatrix} \sum x_n^2 & \sum x_n y_n & \sum x_n \\ \sum x_n y_n & \sum y_n^2 & \sum y_n \\ \sum x_n & \sum y_n & n \end{bmatrix} \cdot \begin{bmatrix} a \\ b \\ c \end{bmatrix} = \begin{bmatrix} \sum z_n x_n \\ \sum z_n y_n \\ \sum z_n \end{bmatrix}$$

$$\begin{bmatrix} a \\ b \\ c \end{bmatrix} = \begin{bmatrix} \sum x_n^2 & \sum x_n y_n & \sum x_n \\ \sum x_n y_n & \sum y_n^2 & \sum y_n \\ \sum x_n & \sum y_n & n \end{bmatrix}^{-1} \begin{bmatrix} \sum z_n x_n \\ \sum z_n y_n \\ \sum z_n \end{bmatrix}.$$

By solving the above equation, the plane constants a, b and c can be determined. With a, b and c, a plane 1000 of z=ax+by+c, can be constructed which can then be used as the predictor plane for the current CU 702.

In some embodiments, the sample points 1002 1004 used can be one, or more than one, reconstructed left column(s) of neighboring pixels 704 and one, or more than one, reconstructed top row(s) of neighboring pixels 706.

Additionally, since the reconstructed pixels 704 706 are available at the decoder end, a decoder can construct the same plane 1000 using the same least square method for a current CU 702. Thus, no additional overhead is required to be transmitted to the decoder for the plane 1000 information.

In some alternate embodiments, the original pixels of a current CU 702 can be used to build a predictor plane 1000 of z=ax+by+c for the current CU using the least square method. However, the plane constants, a, b and c can be transmitted as part of the transmission, if the decoder does not otherwise have access to such plane constants.

Figure 11:
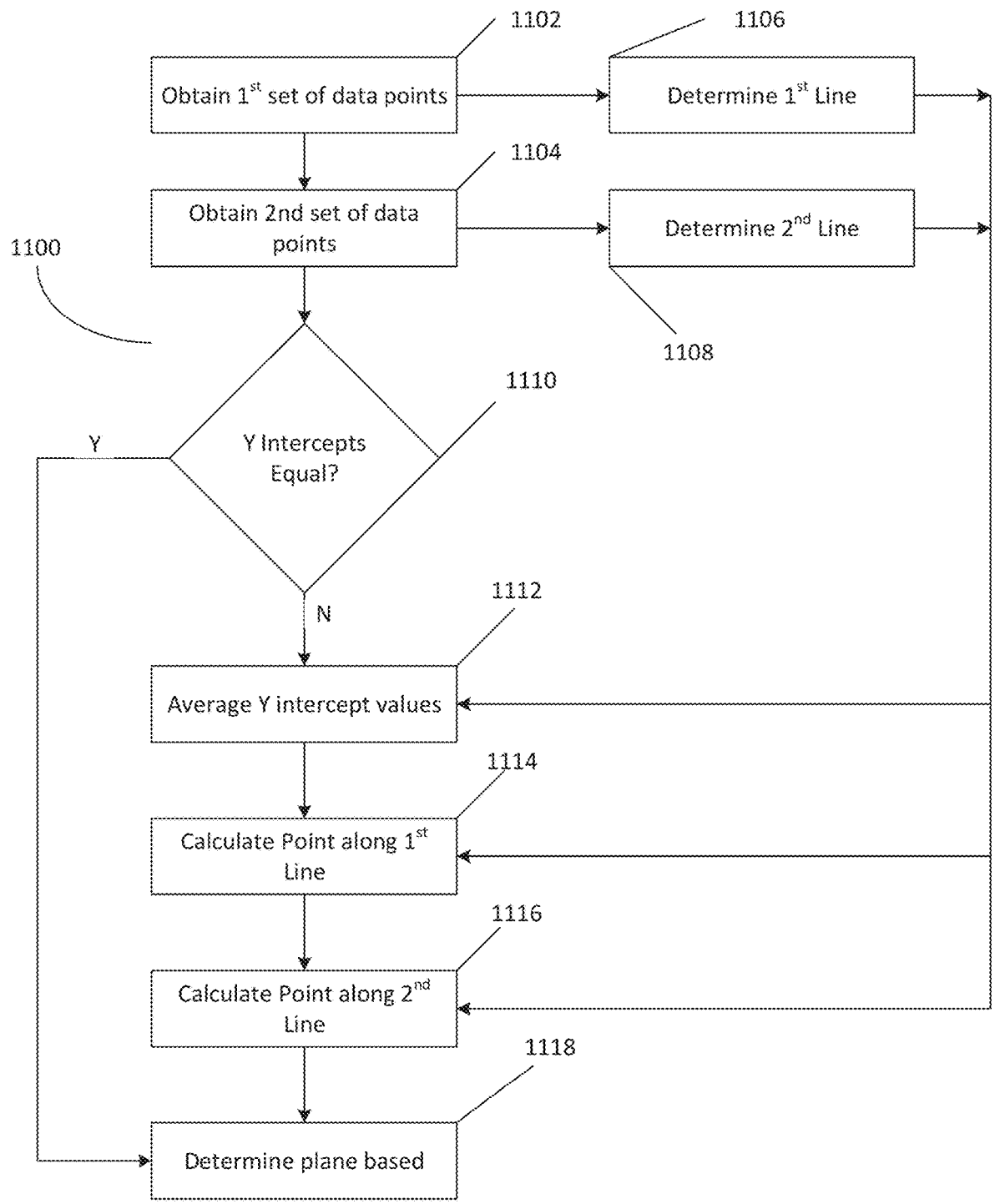
FIG. 11 depicts a block diagram of a method of constructing a prediction plane.

FIG. 11 depicts a block diagram of a method of constructing a prediction plane 1100. In step 1102 a first set of data points from a first line are obtained and in step 1104 a second set of data points from a second line are obtained. Then in step 1106 a first line can be defined based on the first set of data points and in step 1108 a second line can be defined based on the second set of data point. In some embodiments, the first and second lines can be defined based on a least squares method. However, alternate embodiments, any known convenient and/or desired method of defining a line based on a collection of data points can be used.

In step 1110, a determination can be made regarding whether y-intercepts of the first and second lines are coincident. If in step 1110, it is determined that the y-intercepts of the first and second lines are not coincident, then the average of the y-intercepts of the first and second lines can be determined in step 1112.

In steps 1114 and 1116, values along the first and second lines can be determined and then in step 1118, a plane of form z=ax+by+c can be defined. In some embodiments, the y-intercept average can be employed to construct/define the plane. However, in alternate embodiments, one of the two y-intercepts from the first and second lines can be used to construct/define the plane. Moreover, in some embodiments, the least squared method can be used to construct/define the plane. However, in alternate embodiments, any known convenient and/or desired method of constructing a plane from data points can be used.

Figure 12:
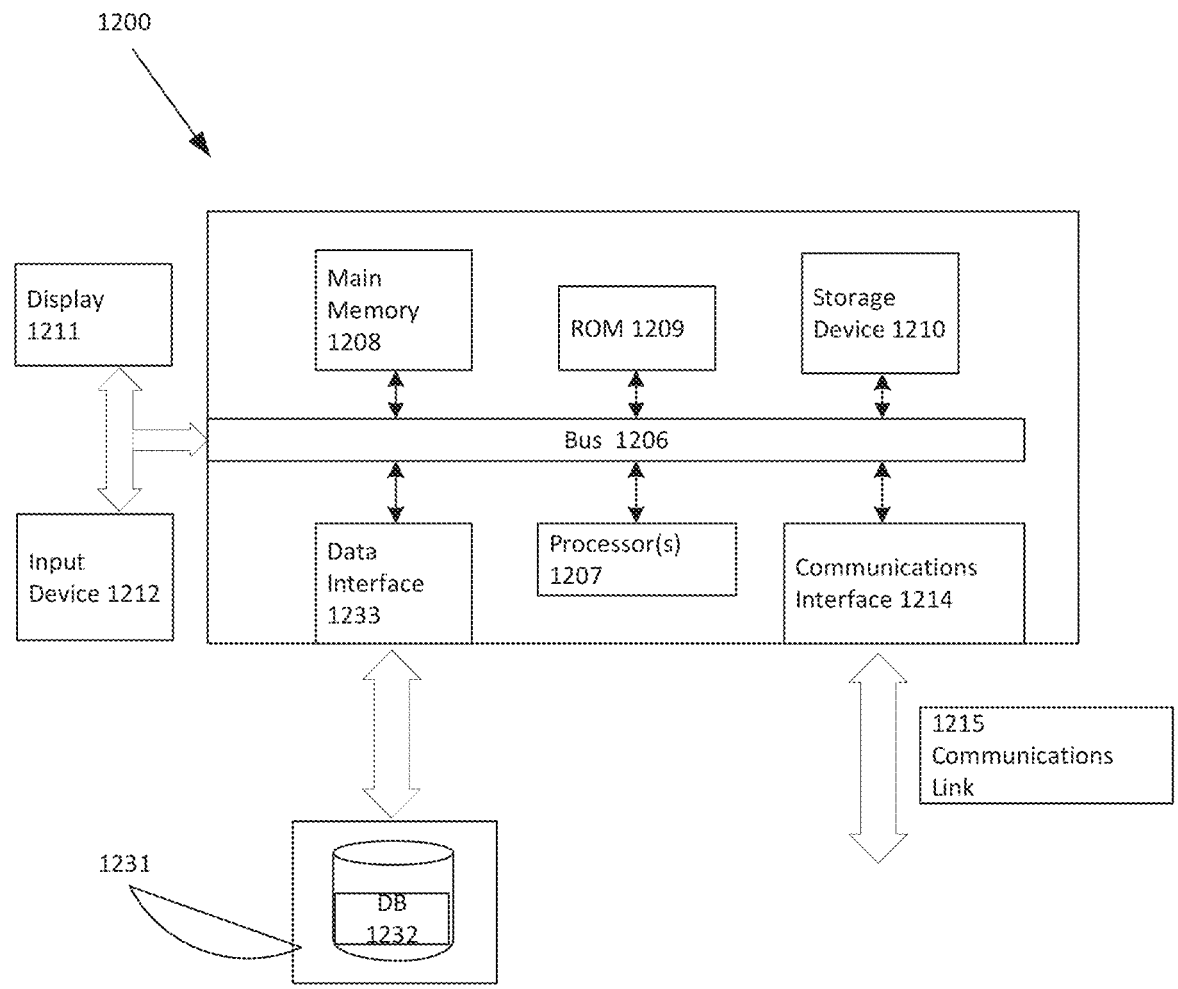
FIG. 12 depicts a block diagram for execution of the system and method.

The execution of the sequences of instructions required to practice the embodiments can be performed by a computer system 1200 as shown in FIG. 12. In an embodiment, execution of the sequences of instructions is performed by a single computer system 1200. According to other embodiments, two or more computer systems 1200 coupled by a communication link 1215 can perform the sequence of instructions in coordination with one another. Although a description of only one computer system 1200 will be presented below, however, it should be understood that any number of computer systems 1200 can be employed to practice the embodiments.

A computer system 1200 according to an embodiment will now be described with reference to FIG. 12, which is a block diagram of the functional components of a computer system 1200. As used herein, the term computer system 1200 is broadly used to describe any computing device that can store and independently run one or more programs.

Each computer system 1200 can include a communication interface 1214 coupled to the bus 1206. The communication interface 1214 provides two-way communication between computer systems 1200. The communication interface 1214 of a respective computer system 1200 transmits and receives electrical, electromagnetic or optical signals, that include data streams representing various types of signal information, e.g., instructions, messages and data. A communication link 1215 links one computer system 1200 with another computer system 1200. For example, the communication link 1215 can be a LAN, in which case the communication interface 1214 can be a LAN card, or the communication link 1215 can be a PSTN, in which case the communication interface 1214 can be an integrated services digital network (ISDN) card or a modem, or the communication link 1215 can be the Internet, in which case the communication interface 1214 can be a dial-up, cable or wireless modem.

A computer system 1200 can transmit and receive messages, data, and instructions, including program, i.e., application, code, through its respective communication link 1215 and communication interface 1214. Received program code can be executed by the respective processor(s) 1207 as it is received, and/or stored in the storage device 1210, or other associated non-volatile media, for later execution.

In an embodiment, the computer system 1200 operates in conjunction with a data storage system 1231, e.g., a data storage system 1231 that contains a database 1232 that is readily accessible by the computer system 1200. The computer system 1200 communicates with the data storage system 1231 through a data interface 1233. A data interface 1233, which is coupled to the bus 1206, transmits and receives electrical, electromagnetic or optical signals, that include data streams representing various types of signal information, e.g., instructions, messages and data. In embodiments, the functions of the data interface 1233 can be performed by the communication interface 1214.

Computer system 1200 includes a bus 1206 or other communication mechanism for communicating instructions, messages and data, collectively, information, and one or more processors 1207 coupled with the bus 1206 for processing information. Computer system 1200 also includes a main memory 1208, such as a random access memory (RAM) or other dynamic storage device, coupled to the bus 1206 for storing dynamic data and instructions to be executed by the processor(s) 1207. The main memory 1208 also can be used for storing temporary data, i.e., variables, or other intermediate information during execution of instructions by the processor(s) 1207.

The computer system 1200 can further include a read only memory (ROM) 1209 or other static storage device coupled to the bus 1206 for storing static data and instructions for the processor(s) 1207. A storage device 1210, such as a magnetic disk or optical disk, can also be provided and coupled to the bus 1206 for storing data and instructions for the processor(s) 1207.

A computer system 1200 can be coupled via the bus 1206 to a display device 1211, such as, but not limited to, a cathode ray tube (CRT) or a liquid-crystal display (LCD) monitor, for displaying information to a user. An input device 1212, e.g., alphanumeric and other keys, is coupled to the bus 1206 for communicating information and command selections to the processor(s) 1207.

According to one embodiment, an individual computer system 1200 performs specific operations by their respective processor(s) 1207 executing one or more sequences of one or more instructions contained in the main memory 1208. Such instructions can be read into the main memory 1208 from another computer-usable medium, such as the ROM 1209 or the storage device 1210. Execution of the sequences of instructions contained in the main memory 1208 causes the processor(s) 1207 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 1207. Such a medium can take many forms, including, but not limited to, non-volatile, volatile and transmission media. Non-volatile media, i.e., media that can retain information in the absence of power, includes the ROM 1209, CD ROM, magnetic tape, and magnetic discs. Volatile media, i.e., media that can not retain information in the absence of power, includes the main memory 1208. Transmission media includes coaxial cables, copper wire and fiber optics, including the wires that comprise the bus 1206. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

Figure 13:
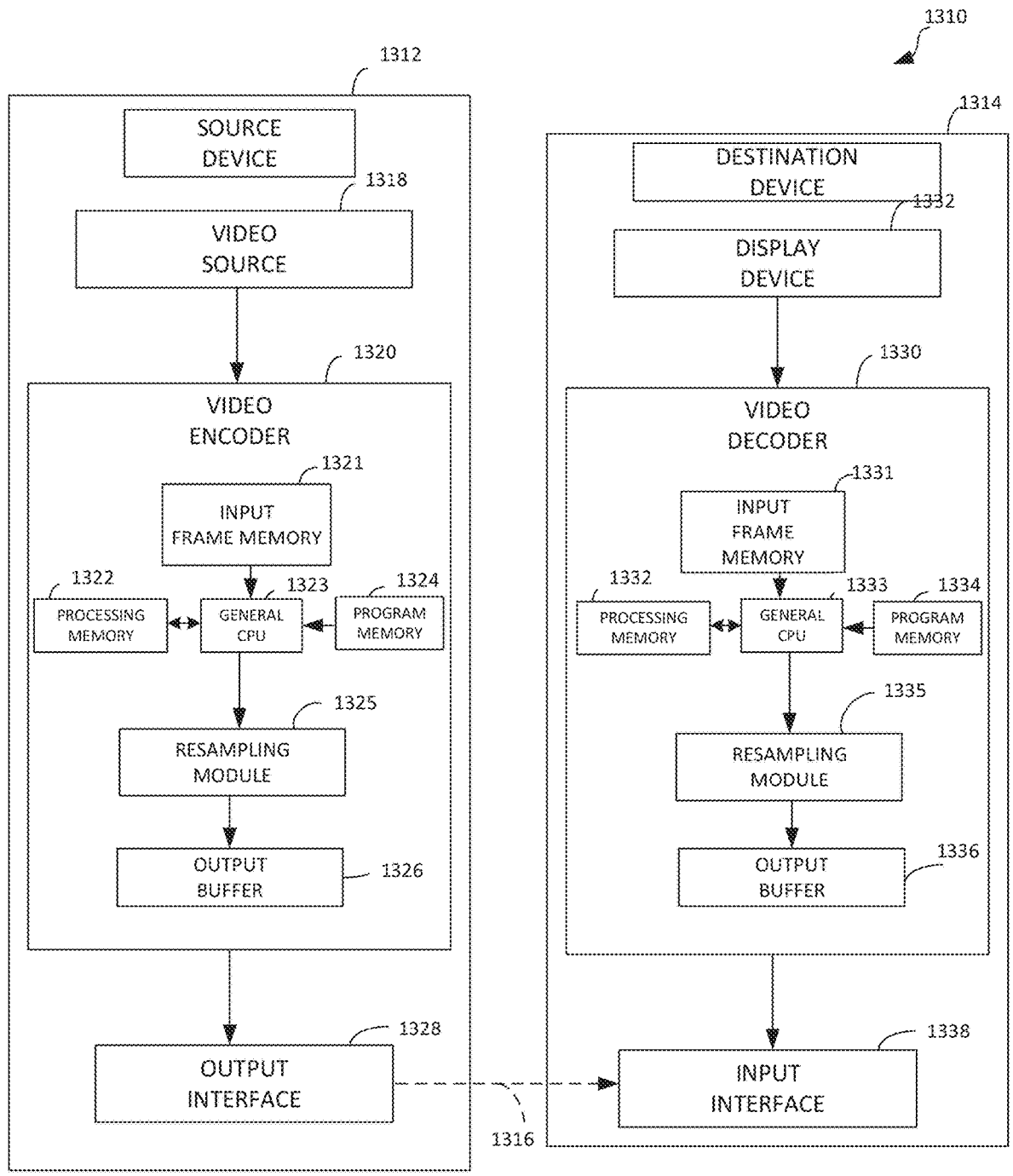
FIG. 13 depicts a block diagram of a coder/decoder for use in a JVET system.

FIG. 13 is a high level view of a source device 1312 and destination device 1310 that may incorporate features of the systems and devices described herein. As shown in FIG. 13, example video coding system 1310 includes a source device 1312 and a destination device 1314 where, in this example, the source device 1312 generates encoded video data. Accordingly, source device 1312 may be referred to as a video encoding device. Destination device 1314 may decode the encoded video data generated by source device 1312. Accordingly, destination device 1314 may be referred to as a video decoding device. Source device 1312 and destination device 1314 may be examples of video coding devices.

Destination device 1314 may receive encoded video data from source device 1312 via a channel 1316. Channel 1316 may comprise a type of medium or device capable of moving the encoded video data from source device 1312 to destination device 1314. In one example, channel 1316 may comprise a communication medium that enables source device 1312 to transmit encoded video data directly to destination device 1314 in real-time.

In this example, source device 1312 may modulate the encoded video data according to a communication standard, such as a wireless communication protocol, and may transmit the modulated video data to destination device 1314. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 1312 to destination device 1314. In another example, channel 1316 may correspond to a storage medium that stores the encoded video data generated by source device 1312.

In the example of FIG. 13, source device 1312 includes a video source 1318, video encoder 1320, and an output interface 1322. In some cases, output interface 1328 may include a modulator/demodulator (modem) and/or a transmitter. In source device 1312, video source 1318 may include a source such as a video capture device, e.g., a video camera, a video archive containing previously captured video data, a video feed interface to receive video data from a video content provider, and/or a computer graphics system for generating video data, or a combination of such sources.

Video encoder 1320 may encode the captured, pre-captured, or computer-generated video data. An input image may be received by the video encoder 1320 and stored in the input frame memory 1321. The general purpose processor 1323 may load information from here and perform encoding. The program for driving the general purpose processor may be loaded from a storage device, such as the example memory modules depicted in FIG. 13. The general purpose processor may use processing memory 1322 to perform the encoding, and the output of the encoding information by the general processor may be stored in a buffer, such as output buffer 1326.

The video encoder 1320 may include a resampling module 1325 which may be configured to code (e.g., encode) video data in a scalable video coding scheme that defines at least one base layer and at least one enhancement layer. Resampling module 1325 may resample at least some video data as part of an encoding process, wherein resampling may be performed in an adaptive manner using resampling filters.

The encoded video data, e.g., a coded bit stream, may be transmitted directly to destination device 1314 via output interface 1328 of source device 1312. In the example of FIG. 13, destination device 1314 includes an input interface 1338, a video decoder 1330, and a display device 1332. In some cases, input interface 1328 may include a receiver and/or a modem. Input interface 1338 of destination device 1314 receives encoded video data over channel 1316. The encoded video data may include a variety of syntax elements generated by video encoder 1320 that represent the video data. Such syntax elements may be included with the encoded video data transmitted on a communication medium, stored on a storage medium, or stored a file server.

The encoded video data may also be stored onto a storage medium or a file server for later access by destination device 1314 for decoding and/or playback. For example, the coded bitstream may be temporarily stored in the input buffer 1331, then loaded in to the general purpose processor 1333. The program for driving the general purpose processor may be loaded from a storage device or memory. The general purpose processor may use a process memory 1332 to perform the decoding. The video decoder 1330 may also include a resampling module 1335 similar to the resampling module 1325 employed in the video encoder 1320.

FIG. 13 depicts the resampling module 1335 separately from the general purpose processor 1333, but it would be appreciated by one of skill in the art that the resampling function may be performed by a program executed by the general purpose processor, and the processing in the video encoder may be accomplished using one or more processors. The decoded image(s) may be stored in the output frame buffer 1336 and then sent out to the input interface 1338.

Display device 1338 may be integrated with or may be external to destination device 1314. In some examples, destination device 1314 may include an integrated display device and may also be configured to interface with an external display device. In other examples, destination device 1314 may be a display device. In general, display device 1338 displays the decoded video data to a user.

Video encoder 1320 and video decoder 1330 may operate according to a video compression standard. ITU-T VCEG (Q6/16) and ISO/IEC MPEG (JTC 1/SC 29/WG 11) are studying the potential need for standardization of future video coding technology with a compression capability that significantly exceeds that of the current High Efficiency Video Coding HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. A recent capture of JVET development is described in the "Algorithm Description of Joint Exploration Test Model 5 (JEM 5)", JVET-E1001-V2, authored by J. Chen, E. Alshina, G. Sullivan, J. Ohm, J. Boyce.

Additionally or alternatively, video encoder 1320 and video decoder 1330 may operate according to other proprietary or industry standards that function with the disclosed JVET features. Thus, other standards such as the ITU-T H.264 standard, alternatively referred to as MPEG-4, Part 10, Advanced Video Coding (AVC), or extensions of such standards. Thus, while newly developed for JVET, techniques of this disclosure are not limited to any particular coding standard or technique. Other examples of video compression standards and techniques include MPEG-2, ITU-T H.263 and proprietary or open source compression formats and related formats.

Video encoder 1320 and video decoder 1330 may be implemented in hardware, software, firmware or any combination thereof. For example, the video encoder 1320 and decoder 1330 may employ one or more processors, digital signal processors (DSPs), application specific integrated circuits (ASICs), field programmable gate arrays (FPGAs), discrete logic, or any combinations thereof. When the video encoder 1320 and decoder 1330 are implemented partially in software, a device may store instructions for the software in a suitable, non-transitory computer-readable storage medium and may execute the instructions in hardware using one or more processors to perform the techniques of this disclosure. Each of video encoder 1320 and video decoder 1330 may be included in one or more encoders or decoders, either of which may be integrated as part of a combined encoder/decoder (CODEC) in a respective device.

Aspects of the subject matter described herein may be described in the general context of computer-executable instructions, such as program modules, being executed by a computer, such as the general purpose processors 1323 and 1333 described above. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Examples of memory include random access memory (RAM), read only memory (ROM), or both. Memory may store instructions, such as source code or binary code, for performing the techniques described above. Memory may also be used for storing variables or other intermediate information during execution of instructions to be executed by a processor, such as processor 1323 and 1333.

A storage device may also store instructions, instructions, such as source code or binary code, for performing the techniques described above. A storage device may additionally store data used and manipulated by the computer processor. For example, a storage device in a video encoder 1320 or a video decoder 1330 may be a database that is accessed by computer system 1323 or 1333. Other examples of storage device include random access memory (RAM), read only memory (ROM), a hard drive, a magnetic disk, an optical disk, a CD-ROM, a DVD, a flash memory, a USB memory card, or any other medium from which a computer can read.

A memory or storage device may be an example of a non-transitory computer-readable storage medium for use by or in connection with the video encoder and/or decoder. The non-transitory computer-readable storage medium contains instructions for controlling a computer system to be configured to perform functions described by particular embodiments. The instructions, when executed by one or more computer processors, may be configured to perform that which is described in particular embodiments.

Also, it is noted that some embodiments have been described as a process which can be depicted as a flow diagram or block diagram. Although each may describe the operations as a sequential process, many of the operations can be performed in parallel or concurrently. In addition, the order of the operations may be rearranged. A process may have additional steps not included in the figures.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

The invention claimed is:

1. A decoder that receives a bitstream indicating how a coding tree unit was partitioned into coding units according to a partitioning structure that allows nodes to be split into coding units according to a partitioning structure that includes a rectangular coding unit, the decoder comprising:

at least one processor that decodes the coding tree units based upon said partitioning structure into coding units including said rectangular coding unit and a plane;

the plane determined by the at least one processor using (1) a first point on a first line and (2) a second point on a second line; where the processor determines the first line using a first set of samples corresponding to side neighboring samples to one of the coding unit, and determines a second line using a second set of samples corresponding to top neighboring samples of one of the coding unit, where the first line is free from being based upon all of the second set of samples, wherein the second line is free from being based upon all of the first set of samples, and wherein the first line is different than the second line.

2. The decoder of claim 1 where the plane is determined based at least in part on at least one of (1) an intersection of the second line and a first samples plane formed in the z-axis direction through the first line and (2) an intersection of the first line and a second samples plane formed in the z-axis direction through the second line.

3. The decoder of claim 2 where the first line is determined based at least in part on application of a least squares method on the first set of samples.

4. The decoder of claim 3 where the second line is determined based at least in part on application of a least squares method on the second set of samples.

5. The decoder of claim 4 where the plane is determined based at least in part on the intersection of the second line and the first samples plane formed in the z-axis direction through the first line.

6. The decoder of claim 4 where the plane is determined based at least in part on the intersection of the first line and the second samples plane formed in the z-axis direction through the second line.

7. The decoder of claim 1 where the plane is determined based at least in part on an average of (1) said intersection of the second line and the first samples plane formed in the z-axis direction through the first line and (2) the intersection of the first line and the second samples plane formed in the z-axis direction through the second line.

8. The decoder of claim 7 where the first line is determined based at least in part on application of a least squares method on the first set of samples.

9. The decoder of claim 8 where the second line is determined based at least in part on application of a least squares method on the second set of samples.

10. The decoder of claim 9 wherein the coding unit includes entropy coding.

* * * * *